US005211874A

United States Patent [19]

Haendler et al.

[11] Patent Number: 5,211,874

[45] Date of Patent: May 18, 1993

[54] STABLE PERACID AND ENZYME BLEACHING COMPOSITION

[75] Inventors: Blanca L. Haendler, Livermore; Frances E. Mitchell, Pleasanton; Dale S. Steichen, Livermore, all of Calif.

[73] Assignee: The Clorox Company, Oakland, Calif.

[21] Appl. No.: 792,332

[22] Filed: Nov. 13, 1991

Related U.S. Application Data

[60] Continuation of Ser. No. 409,479, Sep. 18, 1989, abandoned, which is a division of Ser. No. 899,461, Aug. 22, 1986, Pat. No. 5,089,167, which is a continuation-in-part of Ser. No. 767,980, Aug. 21, 1985, abandoned, and a continuation-in-part of Ser. No. 792,344, Oct. 28, 1985, abandoned, which is a continuation-in-part of Ser. No. 797,890, Nov. 14, 1985, Pat. No. 4,655,301.

[51] Int. Cl.[5] ..... C01B 15/10

[52] U.S. Cl. ..... 252/186.26; 252/95; 252/186.25; 252/174.12

[58] Field of Search ..... 252/186.25, 186.26, 252/174.12

[56] References Cited

U.S. PATENT DOCUMENTS

| | | | |
|---|---|---|---|
| 3,393,153 | 7/1968 | Zimmerer | 252/95 |
| 3,494,787 | 2/1970 | Lund et al. | 117/100 |
| 3,519,570 | 7/1970 | McCarty | 252/174.12 |
| 3,622,366 | 11/1971 | Plester | 252/186.25 |
| 3,639,285 | 2/1972 | Nielsen | 252/186.26 |
| 3,770,816 | 11/1973 | Nielsen | 252/186.26 |
| 3,950,277 | 4/1976 | Stewart et al. | 252/541 |
| 3,959,163 | 5/1976 | Farley | 252/99 |
| 3,983,002 | 9/1976 | Ohya et al. | 195/66 R |
| 4,091,544 | 5/1978 | Hutchins | 34/9 |
| 4,094,808 | 6/1978 | Stewart et al. | 252/186.25 |
| 4,100,095 | 7/1978 | Hutchins et al. | 252/186 |
| 4,126,573 | 11/1978 | Johnson | 252/186.25 |
| 4,128,495 | 12/1978 | McCrudden | 252/186 |
| 4,170,453 | 10/1979 | Kitko | 8/111 |

(List continued on next page.)

FOREIGN PATENT DOCUMENTS

| | | | |
|---|---|---|---|
| 4463 | 10/1973 | European Pat. Off. . | |
| 2746 | 7/1979 | European Pat. Off. . | |
| 1944904 | 4/1971 | Fed. Rep. of Germany . | |
| 2232590 | 1/1975 | France . | |
| 1456591 | 11/1976 | United Kingdom | 252/186.26 |
| 1456592 | 11/1976 | United Kingdom | 252/186.26 |

OTHER PUBLICATIONS

U.S. Application Ser. No. 07/822,459, filed Aug. 24, 1992 (Cont. of Ser. No. 07/384,954, now U.S. Pat. No. 5,093,021).

(List continued on next page.)

*Primary Examiner*—Richard D. Lovering
*Assistant Examiner*—Joseph D. Anthony
*Attorney, Agent, or Firm*—Joel J. Hayashida; Michael J. Mazza; Harry A. Pacini

[57] ABSTRACT

In one embodiment, the invention provides a stable peracid bleach composition comprising discrete granules which comprise peracid, namely, diperoxydodecanedioic acid. In another preferred embodiment, enzymes are present in the composition separate from the discrete peracid granules. In both the enzyme-containing and non-enzyme containing compositions, peracid and exotherm control agents are combined in a discrete granule in which the amount of water is carefully controlled to result in, respectively, maximum peracid and enzyme stability. Standard bleaching composition adjuncts such as fillers, brighteners, pH control agents and the like may be included in the compositions apart from the discrete peracid granules.

17 Claims, No Drawings

U.S. PATENT DOCUMENTS

| | | | |
|---|---|---|---|
| 4,259,201 | 3/1981 | Cockrell et al. | 252/103 |
| 4,337,213 | 6/1982 | Marvnowski et al. | 260/502 R |
| 4,339,356 | 7/1982 | Whyte | 252/522 A |
| 4,381,247 | 4/1983 | Nakagawa et al. | 252/95 |
| 4,391,725 | 7/1983 | Bossu | 252/186.25 |
| 4,430,244 | 2/1984 | Broze et al. | 252/99 |
| 4,435,307 | 3/1984 | Barbesgaard et al. | 252/174.12 |
| 4,443,355 | 4/1984 | Murata et al. | 252/174.12 |
| 4,475,663 | 10/1984 | Kittscher et al. | 220/87 |
| 4,479,881 | 10/1984 | Tai | 252/8.8 |
| 4,501,681 | 2/1985 | Groult et al. | 252/174.12 |
| 4,511,490 | 4/1985 | Stanislowski et al. | 252/174.120 |
| 4,540,721 | 9/1985 | Staller | 523/103 |
| 4,707,287 | 11/1987 | Herdeman | 252/174.12 |
| 5,089,167 | 2/1992 | Coyne et al. | 252/186.26 |
| 5,093,021 | 3/1992 | Coyne et al. | 252/91 |

OTHER PUBLICATIONS

U.S. Application Ser. No. 07/821,522, filed Jan. 14, 1992 (Cont. of Ser. No. 07/402,207).

U.S. Application Ser. No. 07/402,407 (allowed), filed Sep. 18, 1989.

European Search Report, EP 86306442 (published as EP 214 789). (Corresponding to parent U.S. Ser. No. 06/767,980, filed Aug. 24, 1985, now abandoned.

European Search Report, EP 86306443 (published as EP 212 976) (Corresponding to parent U.S. Ser. No. 06/792,344, filed Oct. 20, 1985, now abandoned).

S. N. Lewis, "Peracid and Peroxide Oxidations" in: Oxidation (Marcel Dekker, New York, 1969), vol. 1, Chapter 5, pp. 213-258.

STABLE PERACID AND ENZYME BLEACHING COMPOSITION

Continuation of pending application Ser. No. 07/409,479, filed Sep. 18, 1989 now abandoned, itself a division of co-pending Ser. No. 06/899,461, filed Aug. 22, 1986 now U.S. Pat. No. 5,089,167 a continuation-in-part of both Ser. No. 06/792,344, filed Oct. 28, 1985 and Ser. No. 06/767,980, filed Aug. 21, 1985, the latter two applications being now abandoned which are continuation-in-part of Ser. No. 06/797,890, filed Nov. 14, 1985, now U.S. Pat. No. 4,655,301.

FIELD OF THE INVENTION

This invention relates to household fabric bleaching products, but more particularly to dry bleach products that are based upon stabilized organic diperacid compositions and can contain enzymes. One embodiment of the invention provides a stable peracid bleach composition comprising discrete granules which comprise peracid, namely, diperoxydodecanedioic acid. In another preferred embodiment, enzymes are present in the composition separate from the discrete peracid granules. In both the enzyme-containing and non-enzyme containing compositions, peracid and exotherm control agents are combined in a discrete granule in which the amount of water is carefully controlled to result in, respectively, maximum peracid and enzyme stability.

BACKGROUND OF THE INVENTION

Bleaching compositions have long been in use in households for bleaching and cleaning fabrics. Liquid hypochlorite bleaches have been used most extensively. These hypochlorite bleaches are inexpensive, highly effective, easy to produce, and stable. The advent of modern synthetic dyes and their inclusion in fabrics has introduced a new dimension in bleaching requirements. Modern automatic laundering machines have also changed bleaching techniques and requirements.

The increasing complexity of modern fabrics and laundering equipment has brought forth a need for other types of bleaching compositions. To satisfy this need and to broaden and extend the utility of bleaches for household use, other bleach systems have been introduced in recent years.

Dry bleaching compositions based upon peracid chemical species are desirable new bleaching products. The peracid chemical compositions include one or more of the peroxyacid substituent:

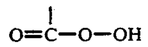

The

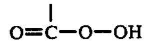

linkage provides a high oxidizing potential. This appears to be the basis for the bleaching ability of such compounds.

In bleach and detergent bleach formulations, it is desirable to combine these peracid compounds with surfactants, builders and fillers. There is a need for fillers, such as sodium sulfate, which are needed to bulk up the bleach product in order to provide easily measurable amounts of bleach product in usage.

However, in these bleach products there remains a need to include exothermic control agents to stabilize against violent decomposition of these peracids. Surprisingly, however, when hydrated magnesium sulfate/sodium sulfate is used as an exotherm control agent, the amount of water present must be rigorously controlled or non-exothermic decomposition of the peracid occurs givng poor product shelf stability.

It is also desirable to include an enzyme in household cleaning products for stain removal purposes. Exemplary enzymes are selected from the group of enzymes which can hydrolyze stains and which have been categorized by the International Union of Biochemists as hydrolases. Grouped within the hydrolases are proteases, amylases, lipases and cellulases.

However organic peracids, while active oxidizing agents are useful in fabric bleaching, also appear to affect enzyme stability since enzymes are somewhat sensitive proteins which have a tendency to denature or change their molecular structures in harsh environments. For this reason, enzymes may be denatured in an environment where there is a concentration of peracid bleaching species.

There is nothing in the prior art which discloses, teaches or suggests that it is crucial to control the amount of water present in the hydrated salt used as an exotherm control agent in a granular peracid composition in order to control peracid decomposition.

Additionally, nothing in the art discloses, teaches or suggests that control of the water in the exotherm control agent is crucial to maintain enzyme stability in peracid-containing compositions.

The present invention solves all of the above and other problems associated with diperacid bleaching compositions.

BRIEF DESCRIPTION OF THE INVENTION

The present invention relates to organic diperacid based bleaching products and in particular to granular organic diperacid bleaching products for household use. In one embodiment, the invention provides a stabilized granular peracid bleach composition, in which the amount of water present in the bleach granules is carefully controlled to maximize stability of the granules.

The invention provides in a further embodiment a peracid and enzyme bleaching composition wherein the active components are an organic diperacid, preferably, diperoxydodecanedioic acid, and an enzyme, generally speaking, a protease. Additional components are present in the product to maximize the active oxygen available for bleaching purposes when placed into aqueous solution, to minimize the decomposition of the peracid while on the shelf, and to reduce or cover the objectionable odor of the diperacid.

Thus, in both embodiments of the invention, the improved product is prepared by carefully controlling the moisture content of the peracid granule with respect to the amount of exotherm control in order to improve both peracid and enzyme stability.

More specifically, the bleaching product is based upon organic diperacids, most preferably diperoxydodecanedioic acid. An exotherm control agent, preferably a combination of $Na_2SO_4$ and $MgSO_4$ in the hydrated form, is admixed with the diperacid in critical amounts to optimize solubility and thus maximize the active oxygen yield when the diperacid is used in aqueous media, yet affords exotherm protection. The water level present in the peracid/exotherm control granule of the composition is also carefully adjusted so that minimum destabilization of the diperacid and enzyme is brought about by its presence, but at the same time, the exotherm control effects are maintained.

The diperacid and its stabilizing agents are prepared as a discrete granular component of the total composition.

It is an object of the invention to provide a diperacid bleach composition having maximum active oxygen yield in solution but retaining necessary exotherm control properties prior to use.

It is another object of the invention to provide diperacid based bleaching product wherein the moisture content of the bleach and exotherm control agent is regulated to minimize deterioration of the enzyme and peracid during the product shelf-life but retaining effective exotherm control of the product and soil and stain removal potency.

It is yet another object of this invention to provide a stabilized peracid and enzyme bleaching composition.

Other objects and advantages of the invention will become apparent from a review of the following description and the claims appended hereto.

DETAILED DESCRIPTION OF THE INVENTION

1. Organic Peracids

This invention relates to organic diperacid based bleaching products. The organic diperacids have the general structure:

$$HOO\overset{O}{\overset{\|}{C}}-R-\overset{O}{\overset{\|}{C}}OOH$$

where R is a linear alkyl chain of from 4 to 20, more preferably 6 to 12 carbon atoms in the chain. These organic diperacids can be synthesized from a number of long chain diacids. U.S. Pat. No. 4,337,213 issued Jun. 29, 1982 to Marynowksi, et al. describes the production of peracids by reacting a selected acid with $H_2O_2$ in the presence of $H_2SO_4$. Such disclosure is incorporated herein by reference.

As noted above the organic diperacids are good oxidants and are already known as useful bleaching agents.

Diperoxydodecanedioic acid (hereinafter: DPDDA), which has the structure:

$$HOO\overset{O}{\overset{\|}{C}}-(CH_2)_{10}-\overset{O}{\overset{\|}{C}}OOH$$

is particularly preferred for use in the present bleaching composition. It is relatively stable compared with other related diperacids and has desirable bleaching characteristics. Other peracids which are stabilized against exothermic decomposition by magnesium sulfate/sodium sulfate also appear suitable for use in the inventive compositions herein. Examples of potentially suitable peracids may include those enumerated in U.S. Pat. No. 4,391,725, issued to Bossu, the specification of which is incorporated herein by reference, and in U.S. patent application Ser. No. 626,825, filed Jul. 2, 1984, entitled "Stable Bleaching Compositions," the disclosure of which is incorporated herein by reference. Amounts by weight, of the peracid should range preferably from about 1–40%, more preferably 2–35%, and most preferably 5–30% weight, when the peracid is is included in a discrete granule. The peracid should deliver, in aqueous media, about 0.1 to 50 ppm A.O. (active oxygen), more preferably 0.5 to 30 ppm A.O. An analysis for, and description of, A.O. appears in S. N. Lewis, "Peracid and Peroxide Oxidations," in: *Oxidation*, pp. 213–258 (1969), the text of which is incorporated herein by reference.

a. Peracid Granules

In the present invention, the peracid is delivered in the form of discrete granules. Applicants define discrete granules as a prepared mixture of peracid and exotherm control agent which are dispersed throughout the granules, which granules are then admixed with fillers. The granule size is not critical, but is generally in the range of about 10 to 200 U.S. Std. Mesh average particle diameter. Peracid granules overcome numerous problems inherent with sensitive peracid compounds.

First, the granules assure that the peracid is kept separated from sensitive components such as brighteners and enzymes. Additionally, since there will always be residual amounts of water present in the bleach composition, by keeping the peracid segregated in discrete granules rather than spread throughout the composition, there is less tendency for the peracid to decompose in the presence of residual moisture itself.

2. Exotherm Control Agents

Like other peracids, however, DPDDA is subject to exothermic decomposition. Thus it is necessary to add exotherm control agents into the granules themselves to inhibit decomposition. The addition of such agents is known, and in this regard similar exotherm control agents to some of those previously known are used in the present product. However, in the present composition it has been surprisingly discovered that if the amount of a component of the exotherm control agent is carefully controlled, a maximum amount of active oxygen will be released from the DPDDA granules when the composition is placed into an aqueous environment.

Although two references, Gougeon et al, G.B. No. 1,456,591, and Gougeon, G.B. No. 1,456,592, disclose the use of magnesium sulfate (in conjunction with sodium sulfate) as an exotherm control agent, the references do not teach, disclose or suggest that certain ratios of magnesium sulfate to peracid are necessary to assure adequate solubility of the peracid granules in aqueous media. In fact, in both references it appears that excessive amounts of magnesium sulfate are taught to be necessary to achieve stability. Solubility of the bleaching composition therefore was not even considered in these references.

In addition, a reference, U.S. Pat. No. 4,094,808, issued to Stewart et al, claims the use of a combination of $MgSO_4$ and $Na_2SO_4$ as a dispersing and/or encapsulation agent for tabular habit diperisophthalic acid. However, this reference utilizes an excess of magnesium sulfate in relation to peracid which makes it unnecessary to carefully control the moisture level of the composition in the formation of the granules. These high levels of magnesium sulfate result in chemically binding all of the water, thus eliminating the need to physically dry the granules.

Surprisingly, applicants have discovered that if high levels of magnesium sulfate are used to bind chemically all of the water in peracid granules similar to the present invention, as taught by Stewart et al, unacceptable solubility results.

The applicants unexpectedly found that to get acceptable solubility and stability, water had to be removed from the granules by a physical drying process as opposed to a chemical drying process.

In the invention, adequate solubility to assure the maximum yield of active oxygen is obtained if the magnesium sulfate component of the exotherm control agent in the peracid granule is less than 1:1 with respect to the peracid, more preferably in the range of about 0.15:1 to 0.9:1, and most preferably about 0.35:1 to 0.75:1 on a weight basis. In the granules, magnesium sulfate should itself be present, by weight, in the range of preferably about 0.9 to 36%, more preferably about 1 to 30%, and most preferably about 2 to 20% by weight.

If the amount of exotherm control agent is increased above the critical levels noted above, the yield of active oxygen is reduced to unacceptable levels. If the exotherm control agent is reduced below the critical levels noted, inadequate exotherm control can result.

When the peracid enzyme composition is in the form of discrete peracid containing granules, other components are necessary for inclusion in the diperacid granules. Sodium sulfate ($Na_2SO_4$) makes up the bulk of the diperacid granules. It cooperates with the $MgSO_4$ in retaining the water of hydration, and dilutes the diperacid. Preferred amounts of $Na_2SO_4$ itself range from about 30 to 90% by weight of the granule, more preferably 35 to 80%, and most preferably 40 to 70%, with the mole ratio of $Na_2SO_4$: $MgSO_4$ being about 1:1, more preferably greater than about 2:1 and most preferably greater than about 5:1.

3. Water Content in the Granule

It is also important that water Le present in the peracid granules comprising DPDDA and the exotherm control agent. In fact the presence of water plays an important role in the exotherm control process as it acts to quench any exothermic decomposition of the diperacid. It is therefore necessary that the exotherm control agent have waters of hydration to serve as a source of water to stem the exothermic decomposition reactions. However, in this invention, the total amount of water present must also be carefully regulated to prevent enzyme and peracid instability.

It has been surprisingly found that the water present in the DPDDA granules should be adjusted to a level of not less than 50% nor more than 70% by weight of $MgSO_4$. This level of water corresponds roughly to about $MgSO_4$ with four molecules of water as waters of hydration. In the composition this exists as a double salt of $MgSO_4$ and $Na_2SO_4$. At these levels, the diperacid remains stable, however, excess amounts of water interfere with the diperacid and enzyme stability.

In the data that follow in the Experimental section, water present in the granule is calculated by Dean-Stark azeotropic distillation method in which any water evolving from the decomposition of DPDDA is first removed by reacting the DPDDA with triphenylphosphine. Thereafter the "killed" granule is refluxed for about an hour at refluxing temperatures in toluene and the distillate is collected in a Dean-Stark trap. The water content of the granule can be directly determined by reading the volume collected in the Dean-Stark trap. The calculated percent water in the granule includes any free moisture plus waters of hydration which vaporize and are collected under reflux conditions. In addition, approximately two moles of water per mole of $MgSO_4$ are not vaporized and are added in to calculate total water. By knowing the $MgSO_4$ content of the granules, the % water by weight $MgSO_4$ can then be calculated.

4. Enzymes

In another preferred embodiment of the invention, an enzyme is included which is selected from enzymes capable of hydrolyzing substrates, e.g., stains. Under the International Union of Biochemistry, accepted nomenclature for these types of enzymes is hydrolases. Hydrolases include, but are not limited to, proteases, amylases (carbohydrases), lipases (esterases), cellulases, and mixtures thereof.

Proteases, especially so-called alkaline proteases, are preferred for use in this invention. Alkaline proteases are particularly useful in the cleaning applications of the invention since they attack protein substrates and digest them, e.g., problematic stains such as blood and grass.

Commercially available alkaline proteases are derived from various strains of the bacterium *Bacillus subtilis.* These proteases are also known as subtilisins. Nonlimiting examples thereof include the proteases available under the tradmarks Esperase®, Savinase® and Alcalase®, from Novo Industri A/S, of Bagsvaerd, Denmark, those sold under the trademarks Maxatase® and Maxacal® from Gist-Brocades N.V. of Delft, Netherlands, and those sold under the trademark Milezyme® APL, from Miles Laboratories, Elkhart, Indiana. Mixtures of enzymes are also included in this invention. See also, U.S. Pat. No. 4,511,490, issued to Stanislowski et al, incorporated herein by reference.

These commercially available proteases are supplied as prilled, powdered or comminuted enzymes. These enzymes can include a stabilizer, such as triethanolamine, clays or starch. The enzyme level, by weight, preferred for use in this embodiment of the invention is about 0.1% to 10%, more preferably 0.25% to 3%, and most preferably 0.4% to 2.%.

Other enzymes may be used in the compositions in addition to, or in place of, proteases. Thus, lipases, which digest fatty substrates, and amylases, which digest starch substrates, can be used in the compositions. These two types of enzymes are available commercially. Lipases are described in U.S. Pat. No. 3,950,277, column 3, lines 15-55, the description of which is incorporated herein by reference. Suitable amylases (and their sources) include Rapidase®, (Société Rapidase, France ), Maxamyl®, (Gist-Brocades N/V). Termamyl®, (Novo Industri A/S), and Milezyme® DAL, (Miles Laboratories). Cellulases, may also be desirable for incorporation and description of exemplary types of cellulases is found from the specifications of U.S. Pat. No. 4,479,881, issued to Tai, U.S. Pat. No. 4,443,355, issued to Murata et al, U.S. Pat. No. 4,435,307, issued to Barbesgaard et al and U.S. Pat. No. 3,983,002, issued to Ohya et al, all of which are incorporated herein by reference.

The problem with incorporating enzymes with peracid bleaches in a cleaning product became immediately apparent. There was an unacceptable loss of stability. However, the source of the problem was not so evident. It is believed (although applicants do not intend to be bound by this theory) that the level of water present after manufacture of the peracid deleteriously affects the stability of the enzymes. Water remains in the peracid because synthesis takes place in an aqueous environment and the exotherm control agent of choice herein, hydrated magnesium sulfate/sodium sulfate, can absorb only limited amounts of this water. It appears that residual water which is unbound by the exotherm control agent harms enzyme stability if not carefully regulated.

Applicants have surprisingly discovered that if the total water level present in their peracid-enzyme product is kept to within a critical level of between about 50 to 70% the magnesium sulfate component of the exotherm control agent, unexpectedly good stability results. More preferably, the level of water should be controlled to within about 50% to 65% and most preferably about 55% to 65% water with respect to the level of magnesium sulfate. If the water level exceeds the very narrow upper limit of the claimed critical range, instability will occur. On the other hand, if one attempts to decrease the water level below the lower limit of the critical range, the peracid will decompose during the drying process. It is surprising that the levels of water present in the granule necessary for good enzyme stability are the same as those required for control of peracid decomposition.

Thus, controlling the water level is critical from two perspectives: Too low a water level can give rise to peracid instability during the processing; too high a water level can impair both peracid and enzyme stability. These problems and now, their solution, had not been heretofore discussed or suggested in the art and represents a substantial advance thereover.

5. Bleach composition adjuncts a. Organic acids

An organic dicarboxylic acid of the general formula:

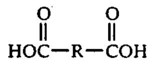

wherein R equals 1 to 9 carbon atoms, for instance adipic acid, is also desirable in the diperacid granules. It also serves to dilute the diperacid, and aids to adjust the pH of the wash water when the bleach product is used.

b. Binding Agents

The diperacid granule has its physical integrity maintained by the presence of binding agents. Particularly and especially desirable are polymeric acids, such as polyacrylic acid and its copolymers, and methyl vinyl ether/maleic anhydride copolymers. Other polymeric acids which may provide this benefit include polyethylene/acrylic acid copolymers. Such materials serve as excellent binders for the granule components and make the granules resistant to dusting and splitting during transportation and handling.

It has been found that DPDDA granules develop an off-odor, reminiscent of rancid butter, when compounded with the dicarboxylic acid, exotherm agent, neutralized polymeric acid binder, and bulking salts. However, unexpectedly if polymeric acid is added in the unneutralized (acid pH) form versus the neutralized form, the development of this unpleasant odor note is eliminated, or greatly reduced.

These polymeric acids should therefore have a pH of substantially below 5, more preferably below 3, or most preferably about 2, when prepared as an aqueous solution of approximately 30 wt % polymeric acid.

The following adjuncts are normally included in the bleaching compositions of the invention separately from the peracid granules.

c. Brighteners

Fluorescent whitening agents (FWA's) are desirable components for inclusion in bleaching formulations. They counteract the yellowing of cotton and synthetic fibers. They function by adsorbing on fabrics during the washing and/or bleaching process, after which they absorb ultraviolet light, and then emit visible light, generally in the blue wavelength ranges. The resulting light emission produces a brightening and whitening effect, thus counteracting any yellowing or dulling of the bleached fabrics. Such FWA's are standard products and are available from several sources, e.g., Ciba Geigy Corp. of Basle, Switzerland under the tradename "Tinopal". Other similar FWA's are disclosed in U.S. Pat. No. 3,393,153 issued to Zimmerer et al., which disclosure is incorporated herein by reference.

Since the diperacid bleaching component of the product is an aggressive oxidizing material, it is important to isolate the FWA component from the diperacid as much as possible. As noted before, the diperacid is dispersed within granules wherein it comprises preferably around 20 wt.% thereof. Similarly it is advantageous to disperse the FWA's within particles separate from the diperacid granules. For this purpose, the FWA may be admixed with an alkaline material that is compatible therewith and which further serves to protect the FWA from the oxidizing action of the DPDDA content of the product. Thus the FWA may be admixed with an alkaline diluent such as $Na_2CO_3$, silicates, etc.

The FWA is mixed with the alkaline diluent, a binding agent and, optionally a bulking agent, e.g., $Na_2SO_4$, and a colorant. The mixture is then compacted to form particles. These particles are then admixed into the bleach product. The FWA particles may comprise a small percentage of the total weight of the bleach product, perhaps 0.5 to 10 wt. % thereof. The FWA is present in a particle form wherein it is admixed with an alkaline diluent material. Thus FWA is protected from the oxidizing action of the diperacid prior to actual use of the bleach product.

d. Fragrances

A fragrance to impart a pleasant odor to the bleaching solution containing the diperacid product is also included. These fragrances are subject to oxidation by the diperacid. Protecting fragrances from oxidizing environments by encapsulating them in polymeric materials such as polyvinyl alcohol is known in the prior art. Quite surprisingly, it has been determined that absorbing fragrance oils into starch or sugar also protects them from oxidation and affords their ready release when placed into an aqueous environment. Therefore, the fragrance, which is secured in the form of fragrance oils, is preferably absorbed into inert materials, such as starches, or sugars, or mixtures of starches and sugars. The absorbed fragrance and starch or sugar base is then formed into beads, wherein the fragrance is imprisoned. Thus the fragrance is added to the bleach product in the form of beads. The fragrance beads are soluble in water. Therefore although the fragrance is protected from attack by the diperacid when the product is in the dry state, i.e., on the shelf, the fragrance is released into the bleach/wash water when the product is used. The fragrance beads are preferred in the product in amounts of perhaps 0.1–2.0 wt. %.

e. Other adjunct ingredients

Other buffering and/or bulking agents are also utilized in the bleaching product. Boric acid and/or sodium borate are preferred for inclusion to adjust the product's pH. The use of boric acid as a pH control agent is noted in Gougeon, GB 1,456,591. Other buffering agents include sodium carbonate, sodium bicarbonate, and other alkaline buffers. Builders include sodium and potassium silicate, sodium phosphate, sodium tripolyphosphate, sodium tetraphosphate, aluminosilicates (zeolites) and various organic builders such as sodium sulfosuccinate. Bulking agents, e.g., $Na_2SO_4$, or builders and extenders are also included. The most preferred such agent is sodium sulfate. Such buffer and builder/extender agents are included in the product in particulate form so that the entire composition forms a free-flowing dry product. The buffer may comprise in the neighborhood of 5 to 90 wt. % of the bleach product; while the builder/extender may comprise in the neighborhood of from 10 to about 90 wt. % of the bleach product.

In order to maintain the product as a free flowing product and reduce dusting, it is advantageous to agglomerate the buffers/builders/extenders with a binder. Suitable binders for such purpose are polymeric acids (such as polyacrylic acid), which were also referred to above as binders for the diperacid granules.

6. Granule Preparation

The DPDDA granules are prepared by first producing a DPDDA wet filter cake, such as by the process of U.S. Pat. No. 4,337,213. Said filter cake is then mixed with the dicarboxylic acid, the exotherm control agents, bulking agents and the binder together to form a doughy mass. The mass is then extruded to form compacted particles. These particles are then partially crushed to form the granules and dried to reduce the moisture content down a level of about 50-70% of the weight of exotherm control agent ($MgSO_4$) present in the granules.

A typical DPDDA granule is: 20 wt. % DPDDA—10 wt. % adipic acid—9 wt. % $MgSO_4$—6% $H_2O$—54 wt. % $Na_2SO_4$—1 wt. % polyacrylic acid (unneutralized).

Non-limiting ranges for the components of the peracid granules are as follows:

| Component | Peracid Granules Wt. % | |
|---|---|---|
| DPDDA | 1-40 | |
| $MgSO_4$ | 0.9-36 | $MgSO_4$:DPDDA Wt. ratio: less than 1:1 |
| $Na_2SO_4$ | 30-90 | $Na_2SO_4$:$MgSO_4$ mole ratio:at least about 1:1 |
| Buffer (adipic acid) | 0-20 | |
| Binder (polyacrylic acid) | 0.1-5 | |
| $H_2O$ content: | 50-70% by weight $MgSO_4$ | |

In the stable bleaching compositions, non-limiting wt. % ranges include:

| Component | Bleach Compositions Wt % |
|---|---|
| Peracid Granules | 1-80 |
| pH Control Particles (boric acid) | 1-50 |
| FWA particles | 0.5-10 |
| Fragrance beads | 0.1-2 |
| Enzymes | 0-10 |
| Bulking Agent ($Na_2SO_4$) | |

EXPERIMENTAL

Some typical formulations for the bleach compositions which do not contain enzymes are as follows:

| | | |
|---|---|---|
| DPDDA Granules | 37.62[1] | wt. % |
| pH control particles (Boric Acid) | 16.9[2] | |
| FWA Particles | 4.2[3] | |
| Fragrance Beads | 0.66 | |
| Bulking Agent ($Na_2SO_4$) | 40.62[4] | |

EXAMPLE 2

| | | |
|---|---|---|
| DPDDA Granules | 18.8[1] | wt. % |
| pH control particles (Boric Acid) | 23.0[2] | |
| FWA Particles | 4.0[3] | |
| Fragrance Beads | 1.0 | |
| Bulking Agent ($Na_2SO_4$) | 53.2[4] | |

[1]DPDDA granules were 20 wt. % DPDDA, 10 wt. % adipic acid, 1 wt. % unneutralized polyacrylic acid binder, 9 wt. % $MgSO_4$, 55 wt. % $Na_2SO_4$. Water content reduced to assure that $H_2O$ was present at 50-70% of weight of $MgSO_4$, e.g., $H_2O$ about 60% of $MgSO_4$ weight.
[2]pH control agent agglomerated with about 1% polyacrylic acid.
[3]FWA particles were 32 wt. % Tinopal 5-BMXC (FWA from Ciba-Geigy); 33 wt. % $Na_2CO_3$; 8 wt. % ultramarine blue; 2.5 wt. % Alcosperse 157A; 5.8 wt. % $H_2O$; $Na_2SO_4$ remainder.
[4]Bulking agent agglomerated with 1.5 wt. % polyacrylic acid.

The above formulations are only illustrative. Other formulations are contemplated, so long as they fall within the guidelines for the diperacid bleach compositions of the invention.

Although the inclusion of unneutralized polyacrylic acid as a binder for the DPDDA granules reduces or eliminates off or rancid odors, the DPDDA itself generates an unpleasant acrid odor. This odor is unpleasant to most individuals and its presence reduces the acceptability of the bleaching product. The fragrance beads present in the product do not overcome this problem.

Most of the fragrance is locked in the beads and is not released until the product is placed into an aqueous environment. Therefore additional steps are necessary to overcome this problem. In this invention, a second source of fragrance is provided to counteract the normal unpleasant odor of the DPDDA.

Specifically, a small adherent amount of fragranced material affixed to the inside of the bleach package at a location normally separated from the bleach formulation. If a cardboard carton is used, a fragranced strip is adhered to an inside upper flap of the carton to fragrance the head space. In such position, the fragranced strip is effectively removed from constant direct contact with the oxidizing component of the bleach composition and undesired oxidation of the admixed fragrance oil is avoided, or at least greatly reduced. Additionally, the use of a polymeric matrix material also affords protection of the entrapped fragrance from oxidation. Thus the fragranced strip comprises an amorphous, hydrophobic, self-adhering polymeric material into which fragrance has been intimately dispersed.

If a clear, plastic bottle is used as the container, the fragrancing material can be added to the melted polymeric matrix (e.g., ethylene vinyl acetate copolymer) and conveniently poured in a premeasured amount into the cap closure of the bottle and allowed to harden. See, U.S. patent application Ser. No. 893,524, filed Aug. 4, 1986, entitled "Oxidant Bleach Dispenser and Fragrancing Means Therefor," the disclosure of which is incorporated herein by reference.

On the other hand, the fragrance does slowly volatilize and permeate the air space within the bleach package to thereby counteract the undersirable odor emanating from the diperacid.

More specifically, the desired fragrance is dissolved in a matrix material, while the matrix material is at an elevated temperature, e.g., 150°-300° F. At such temperature the matrix melts and the fragrance oil is readily admixed therein. Suitable matrix materials are ethylene/ethyl acrylate blends, polyethylene/polypropylene blends, polyamides, polyesters, and ethylene/vinyl acetate copolymers. Ethylene/vinyl acetate copolymers are preferred. Any such matrix material is selected for its ability to melt below a temperature above which a significant portion of the fragrance is volatilized. The material should also strongly adhere to the packaging material surface, e.g., laminated cartonboard, particle board, plastics, non-woven fabrics, etc., when solidified at room temperatures.

The fragranced material is applied to the desired portion of the package interior or, in the bottle version, into the cap closure well, as a hot melt. Upon cooling the fragranced material strongly adheres to the package interior or cap closure, where it slowly releases its fragrance to counteract the objectionable odor of the diperacid.

A typical hot melt fragranced composition may contain from about 10 to 60 wt. % of the fragrance oil and about 10 to 75% vinyl acetate in the ethylene/vinyl acetate copolymer adhesive base. Such fragrance-adhesive mixture should have an equivalent hot melt index of from 1-50,000; and a hot melt ring and ball softening point of from 150°-300° F. About 0.5-10 grams of the fragranced adhesive are applied in a strip to the package interior.

By such means, the diperacid odors are effectively counteracted upon opening and when using the diperacid bleach product.

The diperacid based bleaching product as described hereinabove provides an effective bleaching material when poured into water at which time active oxygen is released. The fragrance beads also dissolve at that time to release their fragrance and counteract any adverse odors released by the diperacid during the bleaching and/or washing cycle.

The following tests further illustrate the above disclosure.

TEST 1

Odor Test

To ascertain the effect of neutralized and unneutralized polymeric acid, two batches of DPDDA granules were made by the process discussed above. The granules comprised 20 wt. % DPDDA, 9 wt. % $MgSO_4$, 1 wt. % of a polymeric acid (polyacrylic acid), 6 wt. % $H_2O$, 10 wt. % adipic acid, and 54 wt. % $Na_2SO_4$. In one batch, the polymeric acid solution (manufactured by the Alco Co. of Chattanooga, Tenn. and sold under the trademark Alcosperse 157A) was neutralized to pH 5. In the companion batch, the polymer was unneutralized. This polymer had a pH of about 2.

An expert olfactory judge found the rancid odor to be significantly higher in the granules containing the neutralized polymeric acid as contrasted to the granules containing the unneutralized polymeric acid.

TEST 2

DPDDA Stability Study

A test was run to determine the effect of the water level in diperacid granules has upon storage stability. No enzyme was present in the bleach composition. Two batches of DPDDA granules were made in accordance with the process disclosed above.

| | BATCH 1 | BATCH 2 |
|---|---|---|
| DPDDA | 20 wt. % | 20 wt. % |
| $MgSO_4$ | 9 | 9 |
| Binding agent | 1 | 1 |
| Adipic acid | 10 | 10 |
| $H_2O$ | 6.2 (68.8% by wt. $MgSO_4$) | 10.8 (120% by wt. $MgSO_4$) |
| $Na_2SO_4$ | remainder | remainder |

The respective granules were then admixed to give compositions similar to that shown in Example 1 above. The respective compositions were then stored at 100° F. for periods of 2 and 4 weeks at which time the loss of DPDDA was determined.

The results were as follows:

| Percent DPDDA Lost | BATCH 1 | BATCH 2 |
|---|---|---|
| 2 weeks storage | 15.6 | 30.2 |
| 4 weeks storage | 23.3 | 65.4 |

The results show that adjusting the water to a level of 50-70% by weight of the $MgSO_4$ substantially increased the stability of the DPDDA.

TEST 3

Solubility Study

A further test was conducted to ascertain the effect the exotherm control agent has upon active oxygen released during the wash/bleach process. No enzymes were present in the bleach composition.

Three batches of DPDDA were prepared as granules in accordance with the process disclosed above. Their compositions were:

| | BATCH 1 | BATCH 2 | BATCH 3 |
|---|---|---|---|
| DPDDA | 20 wt. % | 20 wt. % | 20 wt. % |
| $MgSO_4$ | 9 | 15 | 22 |
| Binding agent | 1 | 1 | 1 |
| Adipic acid | 10 | 10 | 10 |
| Water | 50-70% by weight of $MgSO_4$ | | |
| $Na_2SO_4$ | remainder | remainder | remainder |
| Ratio $MgSO_4$: DPDDA | 0.45:1 | 0.75:1 | 1.1:1 |

Equal portions of each respective batch was then placed into wash water under identical washing conditions and the total amount of active oxygen released was measured. The results were as follows:

| | BATCH 1 | BATCH 2 | BATCH 3 |
|---|---|---|---|
| % of active oxygen released | 96.8 | 100 | 81.3* |

*significant at 95% confidence.

The results illustrates that when the ratio of $MgSO_4$ to DPDDA increased to a level greater than about 1:1, then the release of active oxygen substantially decreases. This demonstrates that the ratio of $MgSO_4$ to DPDDA is critical.

TEST 4

Fragrance Bead Efficacy

The fragrance beads were tested for stability when in the presence of DPDDA. Fragrance beads prepared as noted above, i.e., in starch beads were included in a DPDDA containing composition at a level of 0.50 wt. %. After 8 weeks storage at 100° F., the fragrance containing composition was used in a simulated washing situation and the level of fragrance released was evaluated by an experienced fragrance judge. The level of fragrance was judged to be acceptable. While the fragrance beads were demonstrated to be effective for these peracid formulations, in fact such technique is also applicable to other oxidant bleaches which may impart unpleasant odors in aqueous solution, such as perborate and activator systems, or even dry chlorine bleaches, such as dichloroisocyanurate.

TEST 5

Fragrance Strip Efficacy

A floral type fragrance was mixed with an ethylene/-vinyl acetate resin in accordance with process discussed above. A strip containing the fragrance was formed. The same fragrance was also adsorbed onto a cellulose pad. The strip and pad containing the fragrance were suspended above peracid containing composition in closed containers. After 4 weeks storage at 100° F., the fragrance in the strip was judged by a fragrance expert to be superior to the cellulose pad. The fragrance containing ethylene/vinyl acetate strip exhibited superior fragrance release and stability.

While the fragrance strip is effective for peracid bleach packaging, in fact this technique is also applicable to packages for other oxidant bleaches which may evolve unpleasant odor within the package, such as perborate and activator systems, e.g., tetraacetyl ethylene diamine.

TEST 6

FWA Particle Stability

A test was undertaken to determine the effect of FWA particle composition upon its storage stability in the presence of diperacid. Two batches of FWA particles were made in accordance with the process disclosed above. The respective FWA batch particles were then admixed with diperacid and other components to give formulations similar to that shown in Example 1 above. The composition of the two batches were:

| | BATCH 1 | BATCH 2 |
|---|---|---|
| FWA | 32 wt. % | 32 wt. % |
| $Na_2CO_3$ | 33 | — |
| Binding agent | 8.3 | 8.3 |
| Ultramarine blue | 8 | 8 |
| $Na_2SO_4$ | 18.7 | 51.7 |

These formulations with their respective FWA particles were then stored at 120° F. for a period of 4 weeks, at which time the loss of FWA was determined. As a control FWA as received from the supplier was admixed with the bleach composition and also tested along with the formulated FWA's.

The results were as follows:

| | Storage at 120° F. for 4 weeks | | |
|---|---|---|---|
| | BATCH 1 | BATCH 2 | CONTROL[1] |
| Percent FWA lost | 20.4 | 41.7 | 50.5 |

[1]100% FWA as received from Ciba-Geigy (Tinopal 5BM-GX)

The results show that addition of an alkaline agent substantially increased the stability of the FWA. The FWA stability was also enhanced by the process of particle formation, whereby intimate contact with the oxidant was eliminated.

The examples which follow hereto are illustrative of applicants' improved enzyme and peracid containing formulations:

EXAMPLE 3

| | |
|---|---|
| DPDDA Granules[1] | 9.4 wt. % |
| Boric Acid[2] | 11.5 |
| FWA Particles[3] | 4.0 |
| Fragrance[4] | 0.5 |
| Enzyme[5] | 0.75 |
| Bulking Agent[6] | balance |

[1]DPDDA granules were 20-25 wt. % DPDDA, 10 wt. % adipic acid, 1 wt. % unneutralized polyacrylic acid binder, 9 wt. % $MgSO_4$, $Na_2SO_4$ and water, balance.
[2]pH control agent agglomerated with about 1% polyacrylic acid.
[3]FWA particles were identical to those disclosed in EXAMPLE 1, above.
[4]Proprietary fragrance.
[5]Alcalase ®, an alkaline protease from Novo Industri A/S.
[6]The bulking agent was $Na_2SO_4$ agglomerated with polyacrylic acid.

A test was conducted to determine whether a formulation which contained the critical amount of water claimed in the application would show better results than formulations outside this invention. As a result, the formulation of Example 3 was prepared in three test runs to yield three samples (A, B and C) which contained amounts of water equal to and higher than the critical range. These samples were then subjected to elevated temperatures (100° F.) for two and four weeks to simulate advanced aging (to ascertain enzyme stability and thus simulate product shelf-life).

TEST 7

Enzyme Stability

The formulation of Example 3 with:

| | A | B | C (invention) |
|---|---|---|---|
| Actual $H_2O$ levels[1]: | 13% | 8% | 5% |
| % $H_2O$:[1] | 144.4% | 88.9% | 55.6% |
| Two week stability:[2] | 16.0% | 11.0% | 65.3% |
| Four Week Stability:[2] | 11.0% | 0.0% | 29.3% |

[1]With respect to level of $MgSO_4$ present.
[2]Stability indicated by % enzyme remaining.

The results above demonstrate that if the critical level of water is exceeded, enzyme stability drops drastically. This result was highly surprising since one, upon reading the prior art, would be led to assume that enzymes could be added to peracid formulations without any consideration of their stability therein.

Further, in another comparison test, the stability of an enzyme-containing formulation which is substantially similar to that disclosed in U.S. Pat. No. 4,100,095, issued to Hutchins et al, was compared against the inventive composition. The Hutchins et al composition did not have the peracid in the form of discrete granules as in the present application. In the Hutchins et al reference, the patentee maintained that hydrated salts used as exotherm control agents suffered from several defects. Consequently, the reference maintained that certain water-releasing materials, specifically, selected acids, such as boric acid, would improve the peracid stability. Hutchins et al did not disclose, teach or suggest the use of enzymes in a peracid composition. Surprisingly, the applicants discovered that their inventive compositions had superior enzyme stability in a closed environment over a Hutchins-type composition containing virtually the same amounts of peracid and enzyme. (In the formulations which follow, enzymes were added to a Hutchins-type formulation, since Hutchins et al did not suggest, disclose or teach the addition of enzymes.) The formulations are compared as follows:

| Inventive Formulation | | Hutchins Formulation | |
|---|---|---|---|
| Component | Wt. % | Component | Wt. % |
| DPPDDA granules[1] | 30.1 | DPDDA[7] | 7.4 |
| Boric Acid[2] | 13.4 | DDA[8] | 1.8 |
| FWA Particle[3] | 4.0 | Boric Acid[9] | 13.4 |
| Fragrance[4] | 0.5 | $Na_2SO_4$ | 67.6 |
| Enzyme[5] | 1.0 | FWA | 0.4 |
| | | Enzyme[5] | 1.0 |
| $Na_2SO_6$ | 51.0% | Misc. | 8.4% |
| | 100.0 | | 100.0 |

[1]Granular formulation as in Example 3, above, with DPDDA = 25 wt. %.
[2]pH Control.
[3]FWA particles as in Example 3, above.
[4]Fragrance as in Example 3, above.
[5]Enzyme used was Alcalase ®, an alkaline protease from Novo Industri A/S, Bagsvaerd, Denmark.
[6]Filler, agglomerated as in EXAMPLE 3 above.
[7]DPDDA formulation did not comprise discrete granules but was dispersed throughout product.
[8]DDA: Dodecanedioic acid.
[9]Boric acid reportedly used as an exotherm control in accordance with the patent's teachings.

The results of a four week stability study conducted at 70° F. and 100° F. were:

Test 8

Comparison with Prior Art

| Formula | Temperature 70° F. | 100° F. |
|---|---|---|
| 1. Inventive[1] | 79.0 | 47.0 |
| 2. Hutchins[1] | 60.0 | 12.0 |

As the above test results show, the inventive compositions have better long term and elevated temperature stability than a direct example of the prior art. Applicants are uncertain why their formulations are so much more stable, but, without being bound by theory, applicants speculate that the absence of magnesium sulfate as a control may lessen the stability of the peracid enzyme compositions, for reasons presently unknown. It is further speculated that when DPDDA is combined with an acidic pH control agent, such as boric acid, without the peracid granule of the present invention, that enzyme and peracid instability may result for reasons presently unknown.

In further examples, a different formulation was tested to further demonstrate that criticality of the amount of water present in the granules for peracid stability, whether enzymes are present or not.

EXAMPLE 4

| | |
|---|---|
| DPDDA Granules[1] | 15.8 wt. % |
| Boric Acid[2] | 18.2 |
| FWA Particles[3] | 3.0 |
| Fragrance[4] | 0.79 |
| Bulking Agent[5] | 60.63 |
| Enzyme[6] | 1.58 |
| | 100.0% |

[1]DPDDA granules were 20 wt. % DPDDA, 10 wt. % adipic acid, 1 wt. % unneutralized polyacrylic acid binder, 9 wt. % $MgSO_4$, $Na_2SO_4$ and water, balance.
[2]pH control agent agglomerated with about 1% polyacrylic acid.
[3]FWA particles were identical to those disclosed in Example 1, above.
[4]Proprietary fragrance.
[5]$Na_2SO_4$
[6]Alcalase ® from Novo Industri A/S.

In TEST 9 below, the stabilities at high temperature of three peracid granules in accordance with Example 4 which contained different amounts of water were compared as follows:

| Granule | % $H_2O$ by Wt. $MgSO_4$ | Two Weeks 100° F. | Four Weeks 100° F. |
|---|---|---|---|
| A | 61.1% | 2.6 | 0 |
| B | 83.3% | 16.1 | 32.3 |
| C | 133.3% | 25.0 | 40.6 |

[1]A.O. Loss by standard iodometric titration.

The above data show conclusively that when the critical 50–70% water present by weight of $MgSO_4$ range is exceeded, surprising peracid instability occurs. This is especially apparent at elevated temperatures, e.g., 100° F., for four weeks, which is theoretically meant to simulate about for month storage at room temperature.

In further experiments, applicants attempted to dry the peracid granules so that a water content of less than 50% by weight $MgSO_4$ could be attained. Applicants were unable to accomplish this, indicating that their observation of that the lower limit of 50% water by weight $MgSO_4$ corresponding to $MgSO_4$ with about four waters of hydration was confirmed.

Although the above description and drawings and the claims which follow hereto describe a composition useful as a household bleach, in fact, this invention is not limited thereto and obvious equivalents and alternate embodiments consistent with the scope and content of this application are included therein.

What is claimed is:

1. A magnesium sulfate/sodium sulfate stabilized noncoated peracid and enzyme bleaching composition, consisting essentially of (a) a combination of said peracid and magnesium sulfate/sodium sulfate in a plurality of discrete granules, in which maximum enzyme stability is achieved when the total water present in said granules is controlled to be present in an amount of about 50 to 70% of the weight of magnesium sulfate component; the weight ratio of magnesium sulfate to peracid being less than 1:1 and in which the mole ratio of sodium sulfate to magnesium sulfate is greater than or equal to about 1:1, and (b) enzymes for hydrolyzing stains.

2. The stabilized peracid and enzyme bleaching composition of claim 1 wherein the water content does not exceed about 65% by weight of the magnesium sulfate present in the composition.

3. The stabilized peracid and enzyme bleaching composition of claim 1 wherein the magnesium sulfate is present in an amount sufficient to control exothermic decomposition, but not adversely affect solubility of the granules.

4. The stabilized peracid and enzyme bleaching composition of claim 1 wherein the diperacid has the structure $$HOO\overset{O}{\overset{\|}{C}}-R-\overset{O}{\overset{\|}{C}}OOH,$$

wherein R is $C_{4-20}$ alkyl.

5. The stabilized peracid and enzyme bleaching composition of claim 1 wherein the peracid is a discrete particulate diperacid composition capable of delivering in aqueous solution about 0.1 to 50 ppm A.O.

6. The stabilized peracid and enzyme bleaching composition of claim 5 wherein at least one enzyme is a hydrolase.

7. The stabilized peracid and enzyme bleaching composition of claim 6 wherein at least one enzyme is selected from the group consisting of proteases, amylases, lipases, cellulases and mixtures thereof.

8. The stabilized peracid and enzyme bleaching composition of claim 7 wherein at least one enzyme is an alkaline protease.

9. The stabilized peracid an enzyme bleaching composition of claim 1 further comprising selected adjuncts from the group consisting of fluorescent whitening agents, bluing agents, fillers, builders, surfactants, pH adjusters and mixtures thereof.

10. The stabilized peracid and enzyme bleaching composition of claim 9 wherein the pH adjuster is boric acid.

11. A stabilized noncoated peracid and enzyme bleaching composition in which enzyme stability is prolonged despite constant contact with peracid oxidizing species, comprising:

(a) granules which consist essentially of: (i) about 1 to 40% by weight peracid; (ii) an exotherm control agent which comprises a mixture of magnesium sulfate and sodium sulfate, said magnesium sulfate being about 0.9 to 36% by weight, said sodium sulfate being about 30-90% by weight, and the mole ratio of said sodium sulfate to magnesium sulfate being greater than or equal to about 1:1; and (b) about 0.05 to 10% by weight enzymes;

wherein the weight ratio of magnesium sulfate to peracid ranges from about 0.15:1 to 0.9:1; and the amount of water present in the granules does not exceed 70% of the level of magnesium sulfate.

12. The stabilized peracid and enzyme bleaching composition of claim 11 wherein the enzyme is an alkaline protease.

13. The stabilized peracid and enzyme bleaching composition of claim 11 wherein the water is controlled to be present in an amount of about 50 to 70% of the weight of magnesium sulfate.

14. The stabilized peracid and enzyme bleaching composition of claim 13 wherein the peracid is a diperacid of the structure $$HOO\overset{O}{\overset{\|}{C}}-R-\overset{O}{\overset{\|}{C}}OOH,$$ wherein R is $C_{4-20}$ alkyl.

15. The stabilized peracid and enzyme bleaching composition of claim 14 wherein the peracid is diperoxydodecanedioic acid.

16. A method of stabilizing an enzyme and noncoated peracid bleaching composition which consists essentially of (a) peracid and magnesium sulfate/sodium sulfate exotherm control agent within a plurality of discrete granules, and (b) enzyme, said method comprising:

carefully controlling the amount of water present in the granules such that it does not exceed an amount of about 70% by weight of magnesium sulfate present in the composition for exotherm control purpose; and the weight ratio of magnesium sulfate to peracid being less than 1:1.

17. A bleaching composition comprising magnesium sulfate/sodium sulfate stabilized noncoated peracid and enzyme, said peracid and said magnesium sulfate/-sodium sulfate consisting essentially of a plurality of discrete granules in which enzyme stability is achieved when he total water content in said granules does not exceed about 70% by weight of said magnesium sulfate; wherein the weight ratio of said magnesium sulfate; peracid is less than about 1:1 in order to achieve maximum peracid solubility; and wherein the mole ratio of sodium sulfate to magnesium sulfate is greater than about 2:1.

* * * * *